United States Patent [19]

Yoshimori et al.

[11] 4,036,248
[45] July 19, 1977

[54] VALVE BODY FOR SLEEVE VALVE

[75] Inventors: Ikuo Yoshimori; Teruaki Nanao; Toshio Sugino, all of Hirakata, Japan

[73] Assignee: Kubota Ltd., Osaka, Japan

[21] Appl. No.: 658,111

[22] Filed: Feb. 13, 1976

[30] Foreign Application Priority Data

Feb. 14, 1975 Japan .................................. 50-20983

[51] Int. Cl.² ............................................. F16K 3/26
[52] U.S. Cl. .............................. 137/271; 137/625.38; 137/625.3
[58] Field of Search ...................... 137/625.38, 625.37, 137/271, 625.39, 625.3; 251/205

[56] References Cited
U.S. PATENT DOCUMENTS

| 43,598 | 7/1864 | Noyes | 137/625.38 |
| 3,207,270 | 9/1965 | Ellis, Jr. | 137/625.3 X |
| 3,542,056 | 11/1970 | Chinn et al. | 137/271 |

*Primary Examiner*—Arnold Rosenthal

*Attorney, Agent, or Firm*—Armstrong, Nikaido & Marmelstein

[57] ABSTRACT

A cylindrical valve body for a sleeve valve including the valve body to be secured to the upper wall of a reducing chamber and a valve cylinder gate having open upper and lower ends and slidably fitted in the valve body, the gate communicating at its upper end with an inlet elbow for pressurized water. The valve body is formed in its peripheral wall with a multiplicity of straight bores each having a cylindrical nozzle member fixedly fitted therein and provided with an outwardly tapered port. This construction renders the tapered ports easy to form in the wall of the valve body. The tapered port is closable with a plug including a conical head in conformity with the tapered port and a threaded pin projecting from the top end of the head by inserting the plug into the port and screwing a nut on the threaded pin. By altering the number of the tapered ports so closed, the distribution of open ports is variable to improve the flow ratio characteristics of the valve body.

6 Claims, 7 Drawing Figures

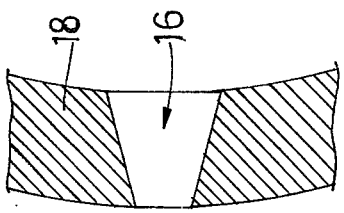
FIG.7
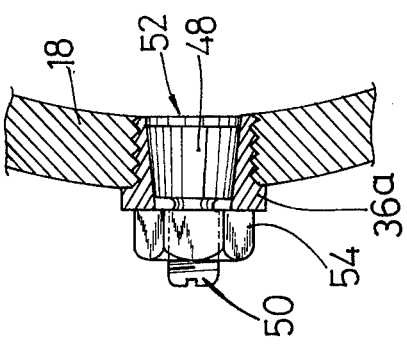
FIG.6
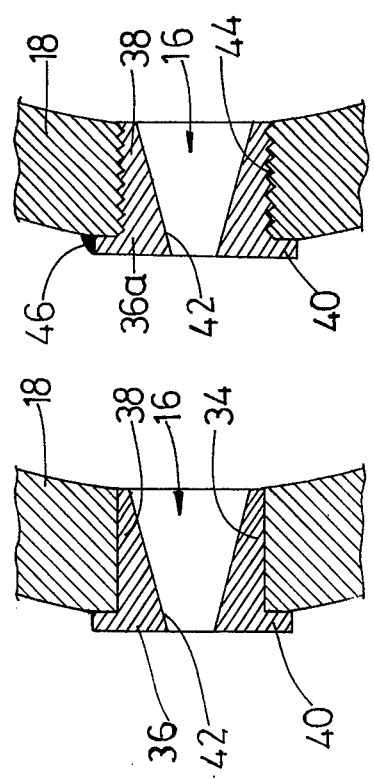
FIG.5
FIG.4

VALVE BODY FOR SLEEVE VALVE

BACKGROUND OF THE INVENTION

Sleeve valves are used for reservoirs or the like. As shown in FIG. 1, the sleeve valve 24 comprises a valve body 18 secured to the upper wall 12 of a water chamber or tank 10 serving as a pressure reducing chamber, and a valve cylinder gate 20 having open ends and vertically slidably fitted in the valve body 18. The valve body 18 includes a lower end closed with a bottom cover 14 and a peripheral wall formed with a large number of discharge ports 16, while the valve cylinder gate 20 has an upper portion extending upward from the valve body 18 and upwardly or downwardly slidable in intimate contact with the inner surface of a high-pressure water inlet elbow 22 communicating with the reducing chamber. The gate 20 is coupled to an electric motor operator 26, which raises the gate 20 to the desired level relative to the bottom cover 14 to alter the number of the discharge ports 16 in communication with the interior and outside of the valve body 18 and to thereby control the flow of water into the reducing chamber.

When jetting out from the discharge ports of the valve body into the reducing chamber, the water produces an intense noise due to cavitation. It is known that the use of outwardly tapered ports 16 as shown in FIG. 7 noticeably reduces this noise and ensures a quiet operation, especially when the ports have a taper angle of about 11°. However, great difficulties are encountered in producing a valve body formed with outwardly tapered ports in its peripheral wall. According to the usual method, the peripheral wall of the valve body is first drilled to form straight holes, and the holes are then reamed to a conical shape from inside the valve body. Thus a large number of ports 16 must be shaped one by one by manual operation which requires much labor and time.

Furthermore, the discharge ports are usually distributed uniformly over the entire area of the valve body peripheral wall, such that in a circumferential direction the ports are arranged in helical rows progressively ascending from the bottom cover 14 so as to continuously alter the outflow of water when the valve cylinder gate 20 is moved upward or downward. The results of experiments have revealed that the relationship between the opening percentage of the gate 20, $h/h_o$, and the flow ratio, $Q/Q_o$, can be represented by a curve A shown in FIG. 3, in which:

$h$: distance the gate is raised from the bottom cover,
$h_o$: maximum distance the gate is raisable from the cover,
Q: rate of outflow of water from the valve body, and
$Q_o$: maximum rate of outflow of water from the body.
Note: Long pipe line is attached onto inlet elbow 22 and outlet pipe in this experiment. It is seen that when the opening percentage is altered from 0 to 10, the flow ratio alters markedly from 0 to 85%, whereas even if the opening percentage is thereafter varied from 10 to 100, the flow ratio increases only by 15%.

In order to overcome this problem, the valve cylinder gate is usually raised gradually at a low velocity for the commencement of discharge of water, so that the sleeve valve requires a long time for opening.

SUMMARY OF THE INVENTION

The valve body of this invention has a multiplicity of straight bores formed in its peripheral wall with a uniform distribution. Each of the straight bores is provided with a cylindrical nozzle member fixedly fitted therein and having a tapered discharge port axially extending through the member. Accordingly the tapered discharge ports can be formed in the peripheral wall with extreme ease.

To establish a linear proportional relation between the opening percentage $h/h_o$ and the flow ratio $Q/Q_o$ to the greatest possible extent, it appears favorable to increase the area or number of the discharge ports progressively from a lower portion of the valve body toward an upper portion thereof. According to this invention, the tapered discharge ports are formed in the valve body first with a uniform distribution, and an appropriate number of discharge ports are thereafter closed with plugs, such that a relatively large number of ports are so closed at a lower portion of the valve body whereas a smaller number of ports are closed at an upper portion of the body. The plug has a conical head and a threaded pin projecting from the top end of the head, and when fitted in the port, the plug is fastened in place by screwing a nut on the pin from outside the body. Consequently, the number of the discharge ports left open increases progressively from a lower portion of the valve body toward an upper portion thereof. It is therefore easy to make a valve body having optimum flow ratio characteristics.

An object of this invention is to provide a valve body for use in a sleeve valve in which outwardly tapered discharge ports can be easily formed in its peripheral wall by attaching nozzle members to the wall.

Another object of this invention is to provide a valve body for a sleeve valve in which an appropriate number of discharge ports are closed with plugs to form open discharge ports progressively increasing in number from a lower portion of the valve body toward its upper portion and to thereby improve the flow ratio characteristics of the valve.

BRIEF DESCRIPTION OF THE DRAWINGS

FIG. 4 is a sectional view of a discharge port;

FIG. 5 is a sectional view of the discharge port in another embodiment;

FIG. 6 is a sectional view of a closed discharge port; and

FIG. 7 is a sectional view of a conventional discharge port.

DETAILED DESCRIPTION OF THE INVENTION

Figure 1:
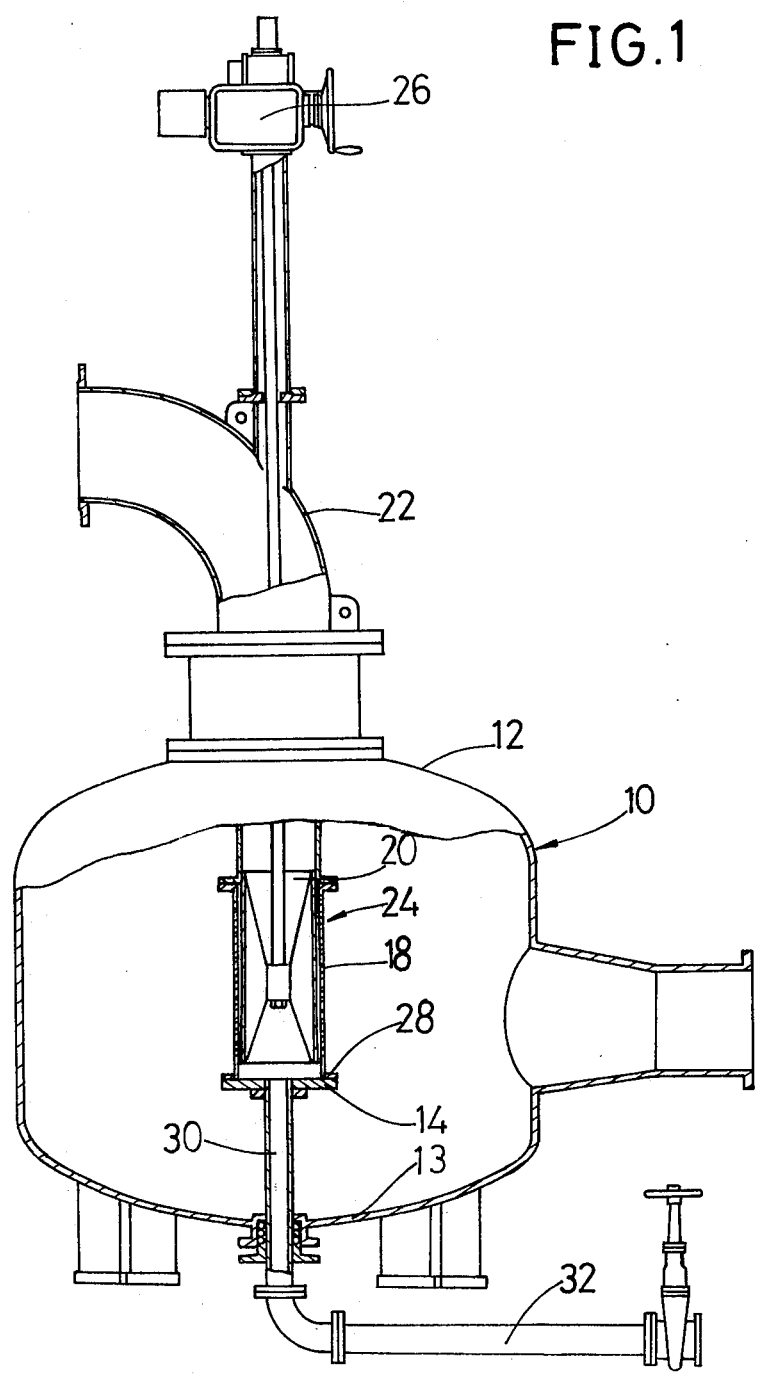
FIG. 1 is a front view partly broken away and showing a sleeve valve incorporating a valve body of this invention.

A sleeve valve 24 includes a valve body 18 provided at its lower end with a bottom cover 14 to which the lower flange of the body is fixed. A drain tube 30 secured at the upper end thereof to the bottom cover 14 has a lower end extending through the bottom wall 13 of a tank 10 and communicating with a discharge pipe 32. When the sleeve valve is installed in a water chamber, the drain tube need not be provided and the lower end of the valve body 18 is closed with a bottom cover having no opening.

As shown in FIG. 4, discharge ports 16 are formed in the peripheral wall of the valve body 18 by forming straight bores 34 of a uniform diameter in the wall, thereafter fitting nozzle members 36 into the bores 34 and fixing the members 36 to the wall. The nozzle member 36 includes a straight cylindrical portion 38 having an outer diameter slightly larger than the inner diameter of the straight bore 34 of the valve body 18 and a flange 40 provided at the outer end of the cylindrical portion 38. The cylindrical portion 38 has an outwardly tapered port 42 axially extending therethrough. The portion 38 has a length equal to or slightly smaller than the thickness of the peripheral wall of the valve body 18. The nozzle member 36 is chilled with dry ice or the like, then fitted into the bore 34 and thereafter left to stand at room temperature, whereby the member 36 can be firmly secured to the straight bore 34. The tapered port 42 in the nozzle member 36 serves as the discharge port 16 of the valve body 18.

FIG. 5 shows the discharge port in another embodiment. The peripheral wall of the valve body 18 is formed with a threaded bore 44 of a uniform diameter extending therethrough, while a nozzle member 36a is threaded on the outer peripheral surface of its straight cylindrical portion 38. After screwing the nozzle member 36a into the threaded bore 44 from outside, the flange 40 is secured to the peripheral wall by welding, caulking, screw or like rotation preventing means 46.

To improve the flow ratio characteristics of the valve, an appropriate number of discharge ports 16 thus formed are closed with plugs 52 each having a conical head 48 in conformity with the tapered port 42 of the nozzle member 36a and a threaded pin 50 extending from the top end of the head 48 as seen in FIG. 6. The plug 52 is inserted from inside the valve body 18 into the port to be closed to fit the head 48 into the port 42, and a nut 54 is screwed from outside on the threaded pin 50 projecting outward from the peripheral surface of the valve body to tightly fit the head 48 in the port 16, whereby the port 16 can be closed.

Because the plug 52 is readily mountable in and detachable from the discharge port 16 of the valve body 18, the distribution of the open discharge ports is variable with extreme ease by altering the number of open ports to enable the sleeve valve to exhibit optimum flow ratio characteristics when it is mounted on a reducing chamber.

EXPERIMENT

Figure 3:
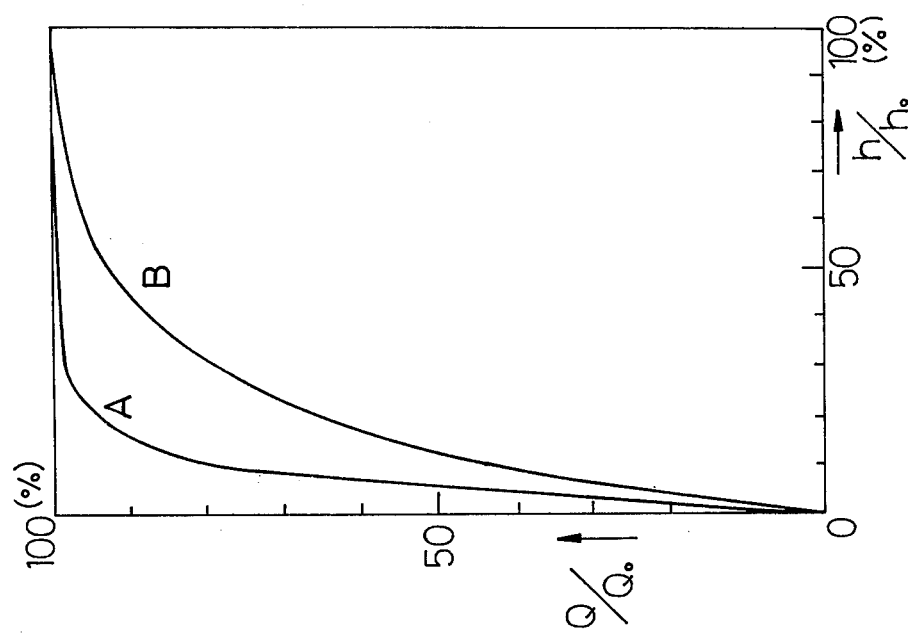
FIG. 3 is a graph showing the relation between the opening percentage plotted as abscissa and the flow ratio as ordinate, as represented by a curve A for a conventional sleeve valve and by a curve B for a sleeve valve of this invention.
Figure 2:
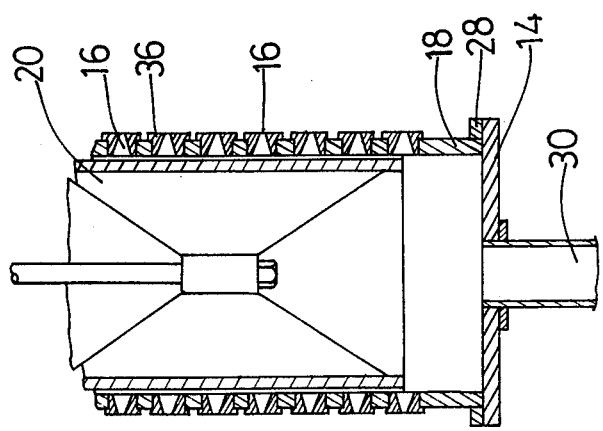
FIG. 2 is an enlarged view in section showing the sleeve valve.

A valve body was tested which had a total of 140 discharge ports eventually openable in its fully opened position. The distribution of open discharge ports in the valve body was so adjusted that the number of open ports in the opening percentage range of 30 to 50 was twice the number of open ports in the opening percentage range of up to 30, and like number in the opening percentage range of above 50 was three times the latter. The valve body had the characteristics, represented by the curve B in FIG. 3, which are more linear than those of a conventional valve body represented by the curve A.

What is claimed is:

1. A valve body for a sleeve valve including the valve body having a peripheral wall formed with a multiplicity of discharge ports extending therethrough, a lower end provided with a bottom cover and an upper end to be secured to an upper wall of a reducing chamber, and a valve cylinder gate having open upper and lower ends and slidably fitted in the valve body in contact with the inner surface of the body, the valve cylinder gate being coupled to means operable from outside for upwardly or downwardly driving the gate to control the number of the discharge ports maintaining the interior of the valve body in communication with the outside thereof and to thereby regulate the flow of water, the valve body being formed with straight bores extending through the peripheral wall and having a uniform inner diameter, each of the straight bores fixedly fittingly receiving thereing a nozzle member including a straight cylindrical portion of a uniform outer diameter, the cylindrical portion having an outwardly tapered opening axially extending therethrough to constitute each of the discharge ports.

2. A valve body as defined in claim 1 wherein the nozzle member is provided at its outer end with a flange secured to the peripheral wall of the valve body by rotation preventing means.

3. A valve body as defined in claim 2 wherein the cylindrical portion of the nozzle member is tightly fitted in the straight bore of the valve body by being chilled, then inserted into the bore and thereafter left to stand at room temperature.

4. A valve body as defined in claim 2 wherein the inner surface defining the straight bore in the valve body and the outer peripheral surface of the cylindrical portion are threaded respectively, and the cylindrical portion is screwed into the straight bore.

5. A valve body as defined in claim 1 wherein the discharge ports are distributed uniformly over the peripheral wall of the valve body, and an appropriate number of discharge ports are closed with plugs so that the number of the open communicating discharge ports increases progressively from a lower portion of the valve body toward an upper portion thereof.

6. A valve body as defined in claim 5 wherein each of the port closing plugs has a conical head in conformity with the tapered opening of the nozzle member and a threaded pin extending from the top end of the head, and a nut is screwed on the threaded pin outwardly projecting from the head inserted in the discharge port of the valve body.

* * * * *